United States Patent [19]
Yoshimi et al.

[11] Patent Number: 5,763,101
[45] Date of Patent: Jun. 9, 1998

[54] POLYALCOHOL FILM AND LAMINATED FILM COMPRISING THE SAME

[75] Inventors: Kazuyori Yoshimi; Keizo Michihata. both of Kurashiki; Akimasa Aoyama. deceased. late of Kurashiki. all of Japan. by Akiko Aoyama. heir

[73] Assignee: Kuraray Co., Ltd.. Kurashiki. Japan

[21] Appl. No.: 623,783

[22] Filed: Mar. 29, 1996

[30] Foreign Application Priority Data

Mar. 31, 1995 [JP] Japan ................................. 7-075824

[51] Int. Cl.$^6$ ................................. B32B 27/42
[52] U.S. Cl. ................................. 428/524; 428/910
[58] Field of Search ................................. 428/500, 524, 428/910

[56] References Cited

U.S. PATENT DOCUMENTS 5,300,596  4/1994  Hlatky ................................. 525/539

FOREIGN PATENT DOCUMENTS 0 322 976  7/1989  European Pat. Off. .
0 372 602  6/1990  European Pat. Off. .

OTHER PUBLICATIONS

Database WPI, Derwent Publications, AN–94 329602, JP-A-06 255 057, Sep. 13, 1994.
Database WPI, Derwent Publications, AN–94 299384, JP-A-06 226 925, Aug. 16, 1994.
Database WPI, Derwent Publications, AN–94 097876, JP-A-06 049 203, Feb. 22, 1994.
Database WPI, Derwent Publications, AN–94 044951, JP-A-05 339 367, Dec. 21, 1993.
Database WPI, Derwent Publications, AN–90 324565, JP-A-02 232 228, Sep. 14, 1990.
Database WPI, Derwent Publications, AN–89 211522, JP-A-01 149 828, Jun. 12, 1989.

*Primary Examiner*—H. Thi Le
*Attorney, Agent, or Firm*—Oblon, Spivak, McClelland, Maier & Neustadt, P.C.

[57] ABSTRACT

A film having a dynamic modulus of elasticity at 75° C. of $10^8$ to $10^{11}$ dyne/cm$^2$ and an oxygen permeability at 20° C., 75% RH of not more than $5\times10^{12}$ cc.cm/cm$^2$.sec.cmHg comprises a polyalcohol obtained by reducing a polyketone comprising a carbon monoxide-ethylene alternate copolymer, the polyalcohol having an intrinsic viscosity of 0.3 to 3.0 dl/g and a melting point of 110° to 180° C.; and a laminated film comprising the same. These films have excellent high-speed bag formability, heat-pack sealability, film formability, film appearance, adhesiveness and gas barrier properties.

10 Claims, No Drawings

POLYALCOHOL FILM AND LAMINATED FILM COMPRISING THE SAME

BACKGROUND OF THE INVENTION

1. Field of the Invention

The present invention relates to polyalcohol films having excellent high speed bag formability, heat-pack sealability, film formability, appearance and adhesiveness, as well as excellent gas barrier properties, and to laminated films comprising the same.

2. Description of the Prior Art

Films comprising polyalcohols obtained by reduction of polyketones are known as described in Japanese Patent Application Laid-open Nos. 339367/1993, 226925/1994 and 255057/1994 and other literature. Japanese Patent Application Laid-open No. 339367/1993 describes a polyalcohol obtained by hydrogenation of an ethylene-carbon monoxide random copolymer using an ether solvent (e.g., 1,3 dioxane) or a mixed solvent thereof with water or alcohol (e.g. methanol). The polyalcohol obtained is described as having good gas barrier properties and is hence useful as a food packaging material. Japanese Patent Application Laid-open Nos. 226925/1994 and 255057/1994 describe, respectively, a multilayered oriented film comprising a layer of a hydrogenated product of an ethylene-carbon monoxide alternating copolymer and a polyolefin layer and a heat shrinkable multilayered film comprising a layer of a hydrogenated product of an ethylene-carbon monoxide alternating copolymer and a polyester layer and that these films are useful as heat shrinkable films.

However, these known polyalcohol films all possess inferior high-speed bag formability, heat-pack sealability, film formability, appearance, adhesiveness and gas barrier properties and hence improvement of these properties is demanded for polyalcohol which is to be used as packaging film.

SUMMARY OF THE INVENTION

Accordingly, one object of this invention is to provide a polyalcohol film having excellent high-speed bag formability, heat pack sealability, film formability, appearance and adhesiveness, as well as excellent gas barrier properties.

Another object of the present invention is to provide a laminated film comprising the above polyalcohol film.

The present invention provides a film having a dynamic modulus of elasticity at 75° C. of $10^8$ to $10^{11}$ dyne/cm$^2$ and an oxygen permeability at 20° C., 75% RH of not more than $5 \times 10^{-12}$ cc.cm/cm$^2$.sec.cmHg and comprising a polyalcohol obtained by reducing a polyketone comprising a carbon monoxide-ethylene alternating copolymer, said polyalcohol having an intrinsic viscosity of 0.3 to 3.0 dl/g and a melting point of 110° to 180° C.

The present invention also provides a laminated film comprising the above film.

DETAILED DESCRIPTION OF THE PREFERRED EMBODIMENTS

The polyalcohol used in the invention is obtained by reducing a polyketone comprising a carbon monoxide-ethylene alternating copolymer and is, in particular, preferably selected from those comprising at least 80% of repeating units each represented by the following formula (I) in view of gas barrier properties, mechanical properties and moldability. The repeating units are preferably present in the polymer in an amount of at least 90%, more preferably at least 95% and most preferably at least 97%.

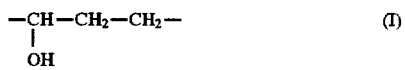

The above polyketone is a carbon monoxide-ethylene alternating copolymer, which includes those obtained by copolymerizing carbon monoxide and ethylene and, also, those consisting essentially of carbon monoxide units and ethylene units and being copolymerized with an unsaturated compound other than ethylene. Examples of the unsaturated compound are olefins having 3 to 12 carbon atoms, dienes having 4 to 12 carbon atoms, vinyl esters, aliphatic unsaturated carboxylic acids and salts and esters thereof. Although carbon monoxide-ethylene copolymers in general include random copolymers and alternating copolymers, the present invention solely is limited to alternating copolymers, which alone only result in a polymer product having the desired functions and effects of a polymer of the invention.

Examples of the above olefins having 3 to 12 carbon atoms are propylene, butene-1, isobutene, pentene-1, 4-methylpentene 1, hexene-1, octene-1, dodecene-1 and styrene. Among these, propylene, olefins having 4 to 8 carbon atoms and combinations of propylene with an olefin having 4 to 8 carbon atoms are preferred. Examples of the dienes having 4 to 12 carbon atoms are butadiene, isoprene, 1,5-hexadiene, 1,7-octadiene and 1,9-decadiene. Examples of the vinyl esters are vinyl acetate, vinyl propionate and vinyl pivalate. Examples of the aliphatic unsaturated carboxylic acids and the salts and esters thereof are acrylic acid, methacrylic acid, maleic anhydride, maleic acid, itaconic acid, acrylic acid esters, methacrylic acid esters, maleic acid monoesters, maleic acid diesters, fumaric acid monoesters, fumaric acid diesters, itaconic acid monoesters, itaconic acid diesters (these esters herein include alkyl such as methyl and ethyl, and like esters), acrylic acid salts, maleic acid salts and itaconic acid salts (these salts include monovalent and divalent metal salts and the like).

These ethylene-carbon monoxide alternating copolymers can be produced by any known process, e.g., those described in Japanese Patent Application Laid-open Nos. 197427/1984, 91226/1986 and 232434/1987, but the process of manufacture is not limited to these metals.

Examples of suitable methods for reducing the polyketone to the corresponding polyalcohol are those which comprise partially or wholly reducing the carboxyl groups present in the polyketone with hydrogen or the like, as described in, for example, Japanese Patent Application, Laid-open Nos. 232228/1990, 339367/1993 and 49203/1994, or one which comprises partially or wholly reducing the carboxyl groups of the polyketone by treatment with a metal hydride, as described in, for example, Japanese Patent Application Laid-open No. 204929/1989.

The polyalcohol films having the features of the present invention cannot be obtained by reduction by all techniques. However, the specific reducing conditions given in the Examples later described result in a reduced polymer which meets the proper requirements of the invention. This fact is sufficiently supported by the later described Examples and Comparative Examples. Besides, the features of the polyalcohol films of the present invention are influenced not only by the reducing conditions, but by the conditions for forming films, such as stretching and heat treating conditions, which are also described later. It is, therefore, important to select these conditions appropriately.

Means for solving the problem of the present invention are now described in detail.

Films for packaging purposes are, in the form of either a monolayer film or a laminated film, generally formed into bags and then put to practical use. The bags are sealed by heat sealing (e.g., impulse sealing, melt-cut sealing and fuse sealing), ultrasonic sealing, high-frequency sealing or like methods.

These methods comprise, while sealing by external heating or internal heat generation of polymer based on loading of external energy such as ultrasonic wave or high frequency wave, softening or melting the polymer by heating.

Films used for packaging are required to have high-speed bag formability to increase productivity. To this end, the sealing temperature should necessarily be high in order to obtain a sufficient sealing strength in a short time of sealing.

In view of the above, where a film comprising a polyalcohol is sealed, in particular a laminated film consisting of a polyalcohol film and a sealant film comprising another polymer is sealed, too low a melting point of the polyalcohol causes the polymer, upon sealing, to soften or melt, thereby leading to poor sealing because the polyalcohol layer thins under pressure applied during sealing.

Further, if the elastic modulus of a polyalcohol decreases by heating on sealing, in particular on high-speed sealing, darts will be generated on the sealed plane, thereby causing poor sealing or poor appearance of the sealed plane for the film to be of any practical use.

It is, therefore, important that the polyalcohol which is used have a melting point of 110° to 180° C., preferably 115° to 170° C., more preferably 120° to 160° C. and that the film comprising the polyalcohol have a dynamic modulus of elasticity at 75° C. of $10^8$ to $10^{11}$ dyne/cm$^2$, preferably $5 \times 10^8$ to $7 \times 10^{10}$ dyne/cm$^2$, more preferably $10^9$ to $5 \times 10^{10}$ dyne/cm$^2$.

If the melting point of a polyalcohol is less than the above range, the polyalcohol layer thins by heat on sealing, thereby causing poor sealing. If the melting point exceeds the above range, gels, fish eyes, and streaks tend to form when the film is formed.

If the dynamic modulus of elasticity of a polyalcohol film is less than the above range, darts generate on the sealed plane on high-speed bag formation, thereby causing poor appearance of sealed plane and poor sealing. If the dynamic modulus of elasticity exceeds the above range, it becomes necessary to increase the sealing pressure, which causes various troubles such as slippage out of position of the sealed plane, poor appearance, thinning of the polyalcohol layer and poor seal strength. In the present invention, it is, therefore, particularly important to set the dynamic modulus of elasticity at the above range.

The melting point of a polyalcohol depends mainly on the basic structure of the polymer. Methods usable for increasing the melting point to meet the requirements of the present invention include one which comprises reacting a polyalcohol with a specific compound, such as vinyltrimethyoxysilane or vinyldimethylmethoxysilane. Conversely, the melting point of a polyalcohol can be readily decreased by copolymerizing, on polymerization of polyketone, a comonomer other than carbon monoxide and ethylene, e.g., an olefin having at least 3 carbon atoms such as propylene and then reducing the obtained copolymer.

The dynamic modulus of elasticity at 75° C. of a polyalcohol film can be increased by crosslinking the polyalcohol with a boron compound such as boric acid or by stretching and heat treating the polyalcohol film, or can be decreased by the above described copolymerization with an olefin having at least 3 carbon atoms such as propylene. A particularly desired embodiment is the formation of tetrahydrofuran (THF) rings in the polyalcohol in adjusted amounts.

Bags prepared by bag formation of the films for packaging are, after being filled with the contents, sealed and then circulated. If they are filled with viscous contents, the sealing method employed comprises heating the contents to decrease the viscosity and filling the bags with them, followed by sealing.

In view of the above, if the polyalcohol film used has too low a dynamic modulus of elasticity at near the filling temperature, darts, will, on packaging the heated contents and sealing with a seal-packer, appear on the sealed plane and cause poor sealing, poor appearance of the sealed plane and even leakage of the contents.

If the dynamic modulus of elasticity at near the filling temperature is too large, it will become necessary to increase the sealing pressure, which causes various troubles such as slippage out of position of sealed plane, poor appearance, thinning of polyalcohol layer and poor seal strength.

Accordingly, it is important, for the purpose of improving heat-pack sealability, to adjust the dynamic modulus of elasticity of the polyalcohol film used to $10^8$ to $10^{11}$ dyne/cm$^2$.

Film formation, in particular high-speed film formation to increase productivity, requires good film formability, i.e., minimal neck-in and its variation on film formations and minimal thickness unevenness. It is also necessary that the film surface obtained have as few fish-eyes or gels as possible, or minimum streaking, or does not present a wood grain pattern, i.e., that the film obtained should have a neat appearance. Needless to say, films having poor film formability and poor appearance cannot be practically used.

In order to improve polyalcohol film formability and film appearance, it is important that the intrinsic viscosity of the polyalcohol be in the range of 0.3 to 3.0 dl/g, preferably 0.5 to 2.5 dl/g, more preferably 0.7 to 2.0 dl/g, and that the melting point be within the range of 110° to 180° C., preferably 115° to 170° C., more preferably 120° to 160° C.

If the intrinsic viscosity of the polyalcohol used is less than the above range, the polymer will exhibit severe neck-in and there will be variations or unevenness of the thickness, which causes wood grain pattern to appear on the obtained film. If the intrinsic viscosity exceeds the above range, the extruder used on film formation will be heavily loaded, which makes it difficult to conduct high-speed film formation, and the resulting film will tend to generate streaks.

If the melting point is lower than the above range, the film obtained has an increased thickness unevenness and exhibits poor high-speed bag formability. If the melting point exceeds the above range, gels, fish-eyes and streaks tend to form.

High interlaminar adhesiveness is required in any one of the following processes for producing laminated films. That is, laminated films are produced by co-extruding a polyalcohol with another polymer; by co-extrusion lamination of a polyalcohol with another polymer via an adhesive polyolefin modified with an unsaturated carboxylic acid or its anhydride; by laminating a polyalcohol film and a film or another polymer via an adhesive such as polyurethane-isocyanate based adhesive; by applying an anker-coat (AC) agent comprising a polyurethane-isocyanate based adhesive on a polyalcohol film and then extrusion-coating another polymer; or by applying the above AC agent on a film of another polymer and then extrusion coating a polyalcohol thereon.

In particular, on high-speed bag formation or heat-pack sealing, the temperature of the polyalcohol film increases, so that the interlaminar adhesiveness of the laminated film comprising the polyalcohol film decreases. It is, therefore, necessary in these cases to improve the interlaminar adhesiveness at elevated temperatures.

The interlaminar adhesiveness, in particular at elevated temperatures, can be improved by setting at the above range the dynamic modulus of elasticity at 75° C. of the polyalcohol film used.

The ground of this improvement is, although not quite clear, considered to be as follows. Against deformation as caused by external stress, too large a dynamic modulus of elasticity causes the stress to concentrate on the interlaminar boundaries, which results in delamination; and, conversely, too small a dynamic modulus of elasticity causes the stress to concentrate on the polyalcohol layer, which has a low strength, thereby impairing the reinforcement effect of lamination, so that the polyalcohol layer is destroyed resulting in delamination.

Accordingly, a sufficient interlaminar adhesiveness cannot be obtained, in particular at elevated temperatures, if the polyalcohol film used has a dynamic modulus of elasticity of either above or below the above range.

It is also desired that, in addition to the setting of the dynamic modulus of elasticity at 75° C. of the polyalcohol film within the above range, the polyalcohol contain a THF ring represented by formula (II) or formula (III) in an amount of 0.01 to 10 mol %, more preferably 0.03 to 5 mol %, most preferably 0.05 to 3 mol %. This incorporation improves, by synergistic effect, the interlaminar adhesiveness to a higher level, in particular that between the polyalcohol film and a layer of polyolefin modified with an unsaturated carboxylic acid or its anhydride at elevated temperatures, that in co-extrusion films with a polyamide at elevated temperatures or that between a polyurethane-isocyanate based adhesive or AC agent at elevated temperatures. The THF ring herein includes 5 member rings containing ether bond, which are represented, for example, by formula (II) and formula (III), and the content of THF ring means the total content of them.

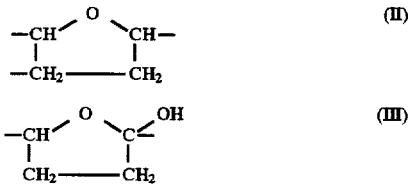

If the content of the THF ring is lower than the above range, the above synergistic effect of improving the interlaminar adhesiveness cannot be produced. If the content exceeds the above range, the high-speed bag formability and heat-pack sealability becomes worse and, besides, the gas barrier properties become worse to a large extent.

A commercially advantageous method for permitting the THF ring to be contained in a polyalcohol is as follows. That is, on reduction of the polyketone, there is formed the corresponding alcohol from the ketone, which can be reacted with the ketone remaining on the polymer to form THF rings represented by formulas (II), (III) and the like.

The amount of the THF ring formed can be appropriately adjusted by proper selection of the solvent and temperature used on reduction of polyketone.

That is, using a solvent for which the polyketone has a low solubility and setting a high reduction temperature can increase the amount of the THF ring in the resulting polyalcohol. On the other hand, use of a solvent in which the polyketone has a high solubility and that of low reduction temperature can suppress formation of the THF ring in the polyalcohol.

The content of the THF ring in a polyalcohol can readily be determined by any known process such as NMR spectroscopy.

Good gas barrier properties are required for packaging materials. In the present invention, it is important that the film have an oxygen permeability at 20° C., 75% RH (unit: $cc.cm/cm^2.sec.cmHg$) of not more than $5 \times 10^{-12}$, preferably not more than $1.5 \times 10^{-12}$ more preferably not more than $1.0 \times 10^{-12}$.

With the oxygen permeability exceeding the above limit, it becomes impossible to prevent the contents from degrading by oxidation, the flavor components of the contents from dissipating outwardly and the external odor components from migrating into the contents.

The oxygen permeability of a polyalcohol film can be readily adjusted by appropriately selecting a method from among, or, if necessary, combining such methods as, in addition to adjustment of the type and content of the above co-monomer in the polyalcohol and adjustment of the content of the THF ring, adjustment of the type and content of the above co-monomer in the polyalcohol and adjustment of the content of the THF ring, adjustment of the cooling conditions, that of heat treating conditions and that of stretching conditions on film formation of the polyalcohol.

With respect to film forming conditions to obtain polyalcohol films having the above features, it is desirable in the present invention that biaxial stretching be conducted at longitudinal and transverse stretch ratios of both 1.5 to 10, preferably 2 to 5 at a temperature of 50° C. to melting point, preferably 70° C. to (melting point −3° C.). In this case, it is more desirable to stretch in a wet state, in order to achieve more uniform stretching. It is also desirable that heat treatment be carried out after the stretching, at a temperature of 70° C. to (melting point −3° C.), preferably 80° C. to (melting point 5° C.) for 1 second to 3 minutes, preferably 5 to 30 seconds. While it is, as described above, desirable to conduct heat treatment after stretching, it is also possible to conduct heat treatment alone. These representative examples are shown in examples to be described later herein.

In the present invention, the term "polyalcohol film" includes, besides those having a thickness of not more than 100μ, i.e., what are known as "films", sheet-like articles having a thickness exceeding 100μ.

The polyalcohol films according to the present invention may appropriately contain, within such limits as not to impair the function and effect produced by the present invention, various additives, e.g., lubricant, antistatic agent, color, heat stabilizer, antioxidant, plasticizer, hydrotalcite, recovering agent such as higher aliphatic acid salt and UV absorber.

The polyalcohol films of the present invention can be laminated on at least one surface thereof with a layer of a moisture-proof thermoplastic resin. Examples of the thermoplastic resin are polyolefin resins, polyester resins, polystyrene resin, polyamide resins, polycarbonate resins, polyvinyl chloride resin, polyvinylidene resin, polyacetal resins, polyurethane resins and ethylene-vinyl alcohol copolymer resin.

Examples of polyolefins usable for this purpose are polyethylenes (high, medium and low density polyethylenes, linear low density polyethylene), ethylene-propylene copolymer, polypropylene, ionomer, ethylene-vinyl acetate copolymer, ethylene-acrylic acid copolymer and ethylene-acrylic acid ester copolymers. Examples of usable polyesters are polyethylene terephthalate and polybutylene terephthalate.

Among these resins, polyolefins, polyesters, polystyrene and polyamides are preferred.

These laminated films are formed by known processes such as co-extrusion and extrusion coating. Scraps generated on conducting these processes are also re-usable.

In producing laminated films, it is often desirable to permit an adhesive resin layer to be present between a layer of the above polyalcohol film of the present invention and that of the above moisture-proof thermoplastic resin layer. On this occasion, any adhesive resin can be used with no specific limitation as long as it can firmly bond the two layers. There are, however, preferably used for this purpose: olefin polymers or copolymers {polyethylenes (low density polyethylene, linear low density polyethylene (LLDPE), super low density polyethylene (SLDPE)}, ethylene vinyl acetate copolymer, ethylene-(meth)acrylic acid copolymer, ethylene (meth)acrylic acid ester (methyl ester or ethyl ester) copolymers, polypropylene and the like grafted with an unsaturated carboxylic acid or its anhydride (e.g., maleic anhydride); and acid anhydride-modified diene polymers, such as acid anhydrides (e.g., maleic anhydride) of hydrogenated styrene-butadiene copolymer and acid anhydrides of ethylene-propylene-diene copolymers.

Examples of the layer constitution of such laminated films are film layer/moisture-proof thermoplastic resin layer/film layer/moisture-proof thermoplastic resin layer/film layer, moisture-proof thermoplastic resin layer/film layer/ moisture-proof thermoplastic resin layer, moisture-proof thermoplastic resin layer/film layer, recovered scrap layer/ moisture-proof thermoplastic resin layer, moisture-proof thermoplastic resin layer/recovered scrap layer/film layer/ recovered scrap layer/moisture-proof thermoplastic resin layer, and those comprising at least one layer of the above adhesive resin present between two adjacent layers of the foregoing. The "film" in the above examples mean the polyalcohol film of the present invention.

When being thus formed into multilayered film, the high-speed bag formability and heat-pack sealability of the polyalcohol film of the present invention are still more improved and so are the water resistance and moisture-proofness of the polyalcohol film.

The polyalcohol films and laminated films comprising the same according to the present invention are formed into bags as they are or subjected to heat molding, e.g., vacuum molding and pressure-vacuum molding into bags or containers for packaging. The resulting bags and containers are suitably used for packaging foods, chemicals, pharmaceuticals, oils and fats; drinking water, cosmetics and like items. The polyalcohol films and laminated films comprising the same of the present invention are also usable for retort containers, bag-in-box, agricultural films.

EXAMPLES

Other features of the invention will become apparent in the course of the following descriptions of exemplary embodiments which are given for illustration of the invention and are not intended to be limiting thereof. In the Examples and Comparative Examples that follow, various properties were tested and evaluations made in accordance with the following methods Testing methods of properties (1) Intrinsic viscosity Obtained from viscosity measurements carried out on a solution of sample in water-containing phenol (water/phenol—15/85 by weight) at 30° C. with Ostwald viscometer.

(2) Melting point

Measured with a differential scanning calorimeter (DSC) (Type RDC220/SSC5200H, made by Seiko Industries, Inc.) at a temperature elevation rate of 10° C./min. The temperature was calibrated with indium and lead.

(3) Dynamic modulus of elasticity at 75° C. Determined from measurements with RHOVIBRON DDV-II-BA made by Oriented Co. at a frequency of 110 Hz and a temperature elevation rate of 3° C./min.

(4) Oxygen permeability

Tested in accordance with JIS K7126, with an oxygen transmission rate tester (MOCON OX-TRAN 10/50, made by Modern Controls, Inc.) at 20° C., 75% RH.

Evaluation methods (1) High-speed bag formability

Three-side sealed bags (150×230 mm) were produced with a high-speed automatic bag forming machine (HSE 500A, made by Seibu Kikai K.K.) at a seal-bar temperature of 170° C. and at a rate of 80 bags/min.

(2) Heat-pack sealability

Ketchup heated to 75° C. was packed with a high-speed automatic packer (K5313, made by Komatsu Ltd.) at a seal temperature of 180° C. and at a rate of 120 bags/min (bag size: 68×85 mm).

(3) Film formability and film surface appearance (3-1) Formation of a monolayer film Polyalcohol sample was extruded with a 60 mm ø extruder through a 720 mm-wide T-die at a temperature 30° C. higher than the melting point of the polyalcohol and taken up at 150 m/min into a film having a thickness of 30μ.

The film formability was evaluated based on observation of the condition during the film formation, i.e., neck-in, neck-in variation and thickness unevenness.

The appearance of film surface was evaluated based on presence or absence of fish eyes, gels, streaks and wood grain position.

(3-2) Formation of co-extrusion laminated film.

Polyalcohol sample and another polymer sample were melted through 2 sets of 60 mm ø extruders, and the two melts were, after being joined at a reed block made by Cloeren Co., extruded through a 720 mm wide T die at a temperature of 30° C. higher than the melting point of the two and then taken up at a speed of 150 m/min, to yield a laminated film having a constitution of polyalcohol 30μ/ another polymer 30μ (total thickness: 60μ). The obtained film was evaluated for film formability and surface appearance in the same manner as in above (3-1).

(4) Interlaminar adhesiveness

Laminated film sample was cut to a width of 15 mm into specimens, which were, after being conditioned at 20° C., 65% RH, subjected to T-peel test with a tensile tester (AUTOGRAPH AG-500A, made by a Shimadzu Corporation) at a peeling speed of 250 mm/min.

(4-1) Co-extrusion laminated film

The laminated film prepared in the above (3-2) was tested.

(4-2) Dry lamination film

A polyurethane-isocyanate adhesive for dry lamination (TAKERAC A-385 (main agent)/TAKENATE A-10 (curing agent), made by Takeda Chemical Industries Ltd.) was, with a thinner of ethyl acetate, applied through a dry laminator on a film other than polyalcohol film in an amount of 3 g-solid/m², and polyalcohol film was then dry laminated on the applied surface to form a laminated film, which was taken as sample.

(5) Food storing capability

A package containing the same ketchup as used for the evaluation of the heat-pack sealability of the above item (2) was placed in a constant-temperature and constant-humidity oven at 35° C., 75% RH for 60 days, and the color of the ketchup deteriorated with time was observed.

The results of the above evaluations were expressed in terms of the following rating.

⊚: excellent o: good

Δ: a little poor

X: poor

Example 1

A polyketone comprising a carbon monoxide-ethylene alternate copolymer (CO ratio: 50 mole %) was reduced in a 10/90 by weight mixed solvent of 1,3 dioxane/methanol and with a ruthenium catalyst carried on a α-alumina (amount carried: 7% by weight) by heating in an autoclave into which hydrogen had been introduced under a pressure of 110 kg/cm²G, at 150° C. for 4 hours, to yield a polyalcohol (PAC) (conversion:100%).

The obtained polyalcohol was formed into a film having a thickness of 30μ by the process described in the above (3-1) and the film was heat treated through a tenter at 100° C. for 10 seconds.

The proportions and evaluation results of the polyalcohol film thus obtained are shown in Tables 1 and 2.

Example 2

A biaxially oriented polypropylene film (OPP, TOCELLO OPU 1, 20μ) was, with its corona, treated surface used for lamination, laminated on one surface of the polyalcohol film obtained in Example 1 in the manner described in (4-2).

A linear low density polyethylene (LLDPE, TOCELLO TUX-TC, 60μ) was used as a sealant and, in accordance with the method described in (4-2), laminated on the polyalcohol surface of the laminated film obtained above, to obtain a 3-layer laminated film.

The properties and evaluation results of the film thus obtained are shown in Tables 1 and 2. In the Tables, the code "//" means that bonding was conducted with a polyurethane-isocyanate adhesive.

Example 3

A polyketone comprising a carbon monoxide-ethylene-propylene alternating copolymer (CO ratio: 50 mole %, propylene ratio: 2 mole %) was reduced in cyclohexanol and with a palladium catalyst carried on a-alumina (amount carried: 5% by weight) by heating in an autoclave into which hydrogen had been introduced under a pressure of 100 kg/cm²G, at 110° C. for 5 hours, to yield a polyalcohol (PAL) (conversion: 100%).

A coextrusion laminated film was prepared from the obtained polyalcohol and a maleic anhydride-modified linear low density polyethylene {ADMER NF505 (M-PO), made by Mitsui Petrochemical Industries, Ltd.} by the process described in the above (3-2)

The properties and evaluation results of the film thus obtained are shown in Tables 1 and 2. Here, the dynamic modulus of elasticity of the polyalcohol film was determined in the following manner. That is, another coextrusion laminated was prepared in the same manner as above except that the above ADMER NF505 was replaced by an unmodified linear low density polyethylene having a melt index of 3.5 (190° C., ASTM D1238), a density of 0.92 g/cm³ and a melting point of 120° C., which properties were similar to those of ADMER NF505, and being mol modified with maleic anhydride. The polyalcohol film part was then taken out from the obtained laminated film by peeling and then tested for the dynamic modulus of elasticity.

Example 4

A coextrusion laminated film was prepared by coextruding the polyalcohol obtained in Example 1 and a nylon-6 having a melting point of 220° C . (1013B (NY), made by Ube Kosan K.K.) in the manner described in the above) (3-2) except that the thickness was changed.

The laminated film obtained was, after being immersed in water, simultaneously biaxially stretched at longitudinal and transversal stretch ratios of both 3 times through a tenter at 85° C. and then heat treated at 120° C. for 8 seconds.

The same linear low density polyethylene as used in Example 2 was laminated on the polyalcohol film side of the thus obtained laminated biaxially oriented film, to obtain a 3-layer laminated film having a constitution of NY(30α)/PAS(30α)//lldpe(60α).

The properties and evaluation results of the film thus obtained are shown in Tables 1 and 2. Here, the dynamic modulus of elasticity of the polyalcohol film was determined in the following manner. That is, the above NY/PAL biaxially oriented film was immersed in trifluoroethanol, and the PAL film was taken out by peeling and then tested for the dynamic modulus of elasticity.

Example 5

The polyalcohol obtained in Example 3 was, in accordance with the above item (3-1), formed into a PAL monolayer film having a thickness of 270μ at a take-up speed of 20 m/min.

The film obtained was, after being immersed in water, simultaneously biaxially stretched at longitudinal and transverse stretch ratios of both 3 times through a tenter at 80° C. and then heat treated at 110° C. for 5 seconds, to yield a biaxially oriented PAL film having a thickness of 30μ.

The properties and evaluation results of the film thus obtained are shown in Tables 1 and 2.

Example 6

A polyketone comprising a carbon monoxide-ethylene alternating copolymer (CO ratio: 50 mole %) was heated in a 80/20 by weight mixed solvent of methanol/water and with a Raney cobalt catalyst by heating in an autoclave into which hydrogen had been introduced under a pressure of 100 kg/cm²G at room temperature, until the inside temperature became 160° C.

Then, after further introduction of hydrogen to a total pressure of 150 kg/cm²G, reduction was effected by heating at: 135° C. for 10 hours, to obtain a polyalcohol (PAL) (conversion: 100%).

The polyalcohol obtained was, in accordance with the above item (3-1), formed into a PAL monolayer film having a thickness of 270μ at a take-up speed of 20 m/min.

The film obtained was simultaneously biaxially stretched at longitudinal and transversal stretch ratios of both 3 times through a tenter at 110° C. and then heat treated at 120° C. for 10 seconds, to yield a biaxially oriented PAL film having a thickness of 30μ.

The properties and evaluation results of the film thus obtained are shown in Tables 1 and 2.

Example 7

The biaxially oriented polyalcohol film obtained in Example 6 was further formed into a 3-layer laminated film in the same manner as in Example 2.

The properties and evaluation results of the film thus obtained are shown in Tables 1 and 2.

Comparative Example 1

A polyketone comprising a carbon monoxide-ethylene-propylene alternating copolymer (CO ratio: 50 mole %, propylene ration: 10 mole %) was reduced in the same manner as in Example 3 except that the reduction solvent was changed to methanol and that the reduction temperature was increased to 170° C., to yield a polyalcohol, which was then formed into a film in the same manner as in the above (3-1) (where, however, heat treatment was not conducted).

The properties and evaluation results of the film thus obtained are shown in Tables 1 and 2.

Comparative Example 2

A 3-layer laminated film was prepared by using the polyalcohol film obtained in Comparative Example 1 in the same manner as in Example 2.

The properties and evaluation results of the film thus obtained are shown in Tables 1 and 2.

Comparative Example 3

A polyketone comprising a carbon monoxide-ethylene alternate copolymer (CO ratio: 50 mole %) was reduced in the same manner as in Comparative Example 1 into a polyalcohol, which was then formed into a film in the same manner as in the above (3-1) except that heat treatment was not done).

The properties and evaluation results of the film thus obtained are shown in Tables 1 and 2.

Comparative Example 4

A polyketone comprising a carbon monoxide-ethylene random copolymer (Co ratio: 47 mole %, reduced viscosity: η sp/c −1.10 dl/g determined by measurement on 0.5 g/l solution in m-cresol) was reduced in a solvent of 1,3-dioxane and with a ruthenium catalyst carried on α-alumina (amount carried: 5% by weight) by heating in an autoclave into which hydrogen had been introduced at room temperature under a pressure of 100 kg/cm$^2$G, at 130° C. for 3 hours, to yield a polyalcohol.

The polyalcohol thus obtained was formed into a film having a thickness of 30° in the same manner as in Example 1 (where, however, heat treatment was not conducted).

The properties and evaluation results of the film thus obtained are shown in Tables 1 and 2.

TABLE 1

| | Intrinsic viscosity (dl/g) | Melting point (°C.) | Dynamic modulus of elasticity (dyne/cm$^2$) | Oxygen permeability (cc · cm/cm$^2$ · sec · ccHg) | Content of THF ring (mol %) | Constitution of laminated film (seal layer: right side) |
|---|---|---|---|---|---|---|
| Example | | | | | | |
| 1 | 1.15 | 142 | 6 × 10$^9$ | 3.0 × 10$^{-14}$ | 1.8 | (monolayer) |
| 2 | 1.15 | 142 | 6 × 10$^9$ | 3.0 × 10$^{-14}$ | 1.8 | OPP//PAL//LLDPE |
| 3 | 1.45 | 135 | 2 × 10$^9$ | 8.0 × 10$^{-14}$ | 1.1 | PAL/M · PO |
| 4 | 1.15 | 142 | 9 × 10$^9$ | 1.5 × 10$^{-14}$ | 1.8 | NY/PAL//LLDPE |
| 5 | 1.45 | 135 | 8 × 10$^9$ | 4.0 × 10$^{-14}$ | 1.1 | (monolayer) |
| 6 | 1.20 | 144 | 1 × 10$^{10}$ | 1.0 × 10$^{-14}$ | 1.5 | (monolayer) |
| 7 | 1.20 | 144 | 1 × 10$^{10}$ | 1.0 × 10$^{-14}$ | 1.5 | OPP//PAL//LLDPE |
| Comparative Example | | | | | | |
| 1 | 0.62 | 103 | 7 × 10$^7$ | 9.0 × 10$^{-12}$ | 13.0 | (monolayer) |
| 2 | 0.62 | 103 | 7 × 10$^7$ | 9.0 × 10$^{-12}$ | 13.0 | OPP/PAL//LLDPE |
| 3 | 1.01 | 108 | 4 × 10$^9$ | 6.0 × 10$^{-12}$ | 14.0 | (monolayer) |
| 4 | 0.68 | 128 | 8 × 10$^7$ | 5.2 × 10$^{-12}$ | 3.0 | (monolayer) |

TABLE 2

| | Evaluation Results | | | | | |
|---|---|---|---|---|---|---|
| | High-speed bag formability | Heat-pack sealability | Film formability | Surface appearance of film | Interlaminate adhesiveness | Food storing capability |
| Example | | | | | | |
| 1 | ○ | ○ | ⊙ | ⊙ | | ○ |
| 2 | ⊙ | ⊙ | ⊙ | ⊙ | ⊙ | ⊙ |
| 3 | ○ | ○ | ⊙ | ⊙ | ⊙ | ○ |
| 4 | ⊙ | ⊙ | ⊙ | ⊙ | ⊙ | ⊙ |

TABLE 2-continued

| | Evaluation Results | | | | | |
|---|---|---|---|---|---|---|
| | High-speed bag formability | Heat-pack sealability | Film formability | Surface appearance of film | Interlaminate adhesiveness | Food storing capability |
| 5 | ○ | ○ | ◉ | ◉ | — | ○ |
| 6 | ○ | ○ | ◉ | ◉ | — | ◉ |
| 7 | ◉ | ◉ | ◉ | ◉ | ◉ | ◉ |
| Comparative Example | | | | | | |
| 1 | x | x | x | x | — | x |
| 2 | x | x | x | x | x | x |
| 3 | Δ | ○ | Δ | Δ | — | Δ |
| 4 | x | x | ○ | ○ | — | Δ |

Obviously, numerous modifications and variations of the present invention are possible in light of the above teachings. It is, therefore, to be understood that within the scope of the appended claims, the invention may be practiced otherwise than as specifically described herein.

What is claimed as new and desired to be secured by Letters Patent of the United States is:

1. A film having a dynamic modulus of elasticity at 75° C. of $10^8$ to $10^{11}$ dyne/cm$^2$ and an oxygen permeability at 20° C., 75% RH of not more than $5 \times 10^{-12}$ cc.cm/cm$^2$.sec.cmHg and comprising a polyalcohol obtained by reducing a polyketone comprising a carbon monoxide-ethylene alternating copolymer, said polyalcohol having an intrinsic viscosity of 0.3 to 3.0 dl/g and a melting point of 110° to 180° C.

2. The film according to claim 1, wherein said polyalcohol contains 0.01 to 10 mole % of tetrahydrofuran ring.

3. The film of claim 2, wherein the tetrahydrofuran ring content in said polyalcohol ranges from 0.03 to 5 mol %.

4. The film of claim 3, wherein the content of said tetrahydrofuran ring in the polyalcohol ranges from 0.05 to 3 mol %.

5. A laminated film comprising the film according to either claim 1 or claim 2 and, provided on at least one surface thereof, a moisture proof thermoplastic resin layer.

6. The film of claim 1, wherein said carbon monoxide-ethylene alternating copolymer is constituted of repeating units, at least 90% of which have the structure:

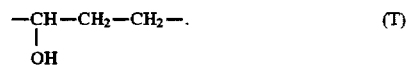

$$-\underset{\underset{OH}{|}}{CH}-CH_2-CH_2-. \qquad (T)$$

7. The film of claim 6, wherein the content of said repeating units is at least 95% of the copolymer.

8. The film of claim 1, wherein said melting point ranges from 115°–170° C. and said dynamic modulus of elasticity ranges from $5 \times 10^8$ to $7 \times 10^{10}$ dyne/cm$^2$.

9. The film of claim 1, wherein the intrinsic viscosity ranges from 0.5 to 2.5 dl/g.

10. The film of claim 1, wherein said oxygen permeability is not more than $1.5 \times 10^{-12}$ cc.cm/cm$^2$.sec.cmHg.

* * * * *